March 26, 1963  S. C. McLAUGHLIN, JR  3,082,763
STRABISMUS THERAPY DEVICE
Filed May 11, 1960  2 Sheets-Sheet 1
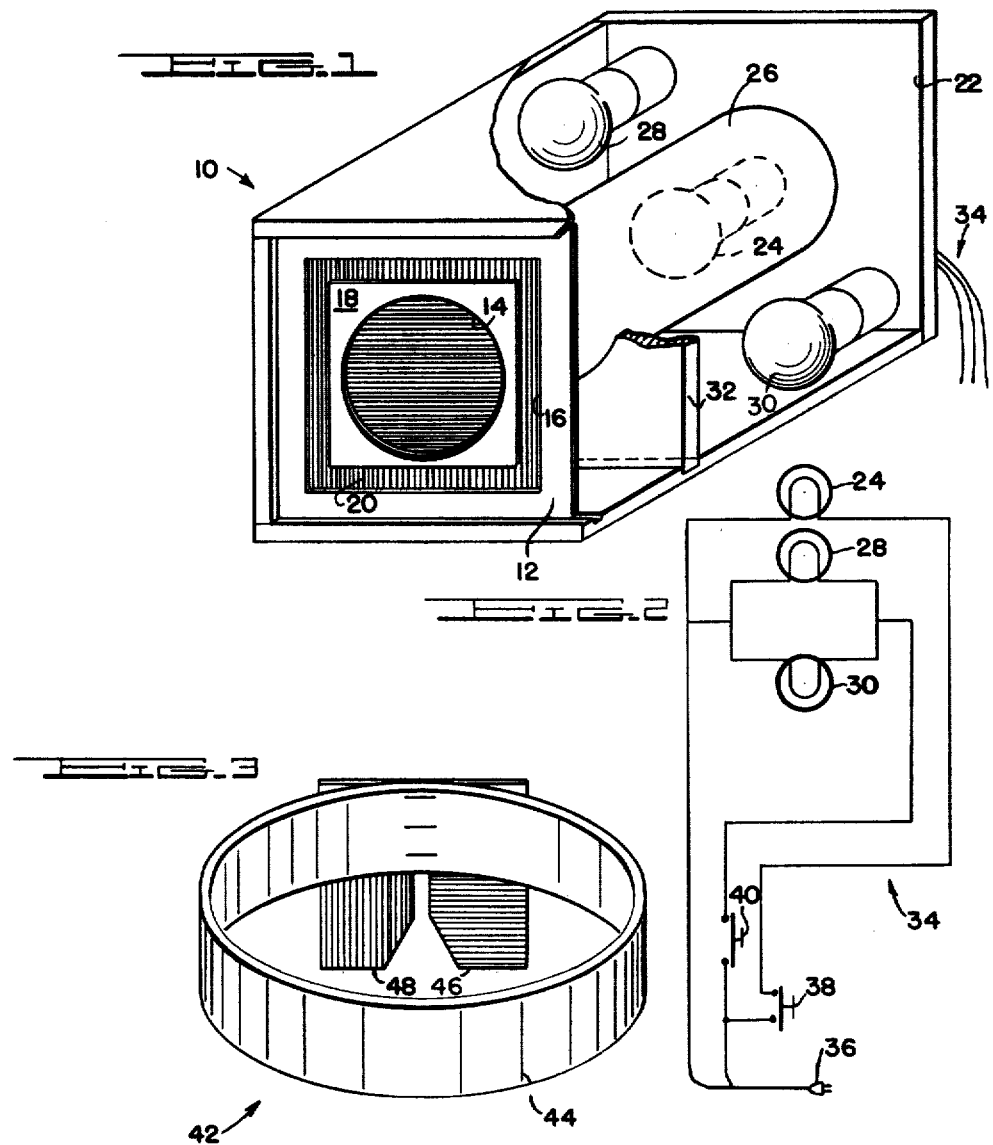
INVENTOR.
SAMUEL C. McLAUGHLIN, JR.
BY
FINN G. OLSEN
ATTORNEY

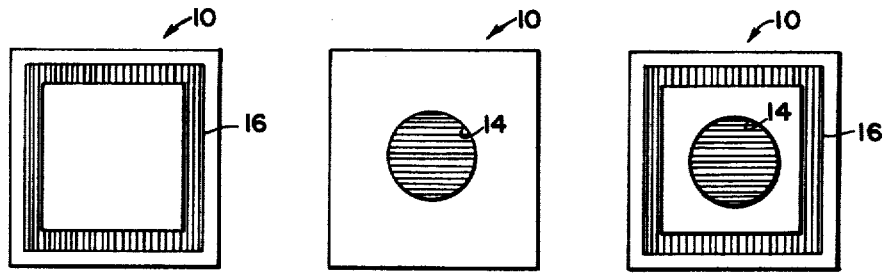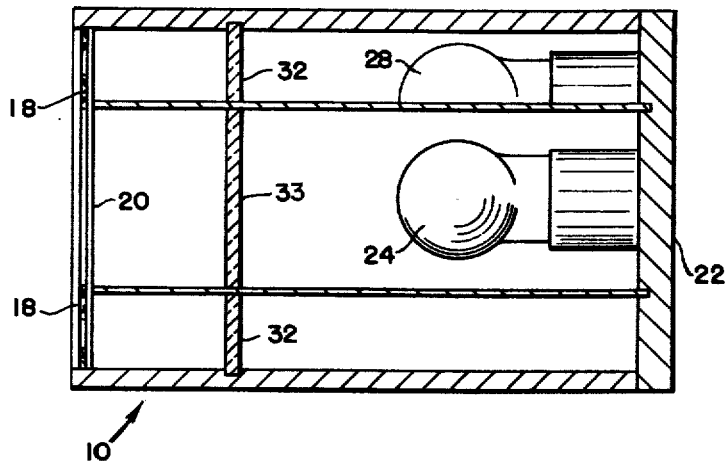

United States Patent Office
3,082,763
Patented Mar. 26, 1963

3,082,763
STRABISMUS THERAPY DEVICE
Samuel C. McLaughlin, Jr., 1210 W. Liberty,
Ann Arbor, Mich.
Filed May 11, 1960, Ser. No. 28,268
9 Claims. (Cl. 128—76.5)

The present invention relates to optical treating devices and particularly to such devices for assisting in treating strabismus patients.

Strabismus is a visual disorder in which the eyes are misaligned. Although it is sometimes believed that certain individuals have both eyes deviated from the line of sight, such is not the case. Every strabismus patient has one eye which "looks at" the object of regard, and this is commonly referred to as his fixating eye. The other eye is said to be his non-fixating eye.

The non-fixating eye may be turned inward toward the nose, or outward away from the nose. The vision may be equal in the two eyes, or there may be a deterioration of the vision in the non-fixating eye. Some individuals have one or another type of intermittent strabismus, in which the eyes are sometimes parallel and sometimes not, the determining factors being quite varied, such as fatigue, exposure to bright lights, effort to focus on a near object, etc.

Many strabismus patients are capable of fixating with either eye at will. When such a patient fixates with his right eye, his left eye assumes the role of the non-fixating eye; similarly, when he alternates to left eye fixation, his left eye becomes his fixating eye and his right eye becomes his non-fixating eye. It is desirable in the treatment of strabismus to enable the patient to fixate with either eye at will.

Two other matters should also be considered to provide a fuller understanding of the problems faced in aiding strabismus patients. First, there is the matter of diplopia, or double vision. If a non-strabismic individual looks at an object with only one eye, and if his other eye is then deviated from the line of sight, then this individual will see two images of the object. When an object is seen double in this fashion, the observer is said to be aware of diplopia for the object. The significant thing about diplopia in strabismus patients is that it is quite rare.

It is evident that this absence of diplopia in a strabismus patient represents some sort of adaption to the deviate position of the eyes; and this inference is confirmed by the fact that adults who become strabismic as a result of injury or disease are very much aware of diplopia. Such patients are said to be incapable of suppressing the image associated with the non-fixating eye. Similarly, the patient with a well-established strabismic condition generally does not see double and is therefore assumed to suppress the second image. It is desirable in the treatment of strabismus to establish an awareness of diplopia on the part of the patient.

The second matter which should be considered is that strabismus is an extremely persistent disorder, not easily remedied. The most obvious therapeutic measure is surgical modification of the extra-ocular musculature of the non-fixating eye so that the innervation habitually sent to that musculature is post-operatively exactly sufficient to hold the eye parallel to its fellow. A competent ophthalmic surgeon can do this, but the results are often disappointing. Furthermore, many strabismus patients can be shown to have no physiological defect which might conceivably account for the mis-alignment of the eyes. Thus, they may have intact and normal extra-ocular musculature, full ocular motility, good vision in each eye, etc. In these patients, the misalignment of the eyes appears to be purposive.

It is the principal object of the present invention to provide a device for treating strabismus patients which as one of its steps of operation will aid the patient in establishing diplopia for an object.

It is another object of the present invention to provide a device of the foregoing character which will enable the patient to fixate with either eye at will.

It is still another object of the present invention to provide a device of the foregoing character which permits patients to perceive movement of images during alternation of fixation.

It is still another object of the present invention to provide a device of the foregoing character which, as a step of its operation, will aid the patient in fusing the two monocular images of an object.

It is still another object of the present invention to provide a device of the foregoing character which will alleviate the deterioration of vision (amblyopia ex anopsia) in the non-fixating eye.

It is still another object of the present invention to provide a device of the foregoing character which, in contrast to haploscopic and other devices which are commonly used in the treatment of strabismus patients, enables the patient to acquire the foregoing visual skills when viewing a real object, a real object being an object whose tactile-kinesthetic properties are not at variance with its properties as a visual stimulus.

Other objects of this invention will appear in the following description and appended claims, reference being had to the accompanying drawings forming a part of this specification wherein like reference characters designate corresponding parts in the several views.

In the drawings:

FIGURE 1 illustrates a housing adapted to be illuminated, with parts removed to show the interior thereof, embodying portions of the apparatus comprising the present invention;

FIGURE 2 is a schematic wiring diagram of the electric circuit for controlling illuminating operations of the portions of the invention shown in FIGURE 1;

FIGURE 3 illustrates a viewing device adapted to be worn by a patient when viewing the housing illustrated in FIGURE 1;

FIGURE 4 illustrates the image which normally will be seen by the left eye of a patient when viewing the housing of FIGURE 1 through the viewing device of FIGURE 3;

FIGURE 5 illustrates the image which normally will be seen by the right eye of a patient when viewing the housing of FIGURE 1 through the viewing device of FIGURE 3;

FIGURE 6 illustrates the normal image which will be seen by both eyes of a patient when viewing the housing of FIGURE 1 through the viewing device of FIGURE 3; and FIGURE 7 is a vertical longitudinal section taken through the housing of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The housing 10 may be constructed of any suitable material, such as plywood, and has a front wall 12 which defines a circular area 14 and a square frame area 16, the latter being spaced from and symmetrically enclosing the circular opening 14. In the illustrated embodiment the spacing between the areas is determined by the masking material 18 which is mounted on the outer surface of the transparent light polarizing or light filtering means 20. The light polarizing means 20 is arranged so that only light waves in horizontal planes can pass through the circular area 14 and only light waves in vertical planes can pass through the square frame area 16.

Mounted on the rear wall 22 is a lamp 24 which is axially aligned with the circular area 14 for illuminating the same. A tubular partition 26 is supported between front and rear walls 12 and 22 into which the lamp 24 extends, and the partition 26 is dimensioned so as to engage the front wall 12 at the masked area between the areas 14 and 16 so that lamp 24, when lit, will illuminate only the circular area 14.

Also mounted on the rear wall 22 are two other lamps 28 and 30 which extend into the housing 10 outside the partitioned area of lamp 24 so as to illuminate, when lit, the square frame area 16. In order to eliminate direct glare from the lamps 24, 28 and 30 and to distribute light therefrom more uniformly over the circular area 14 and the square frame area 16, panes of translucent diffusing material are positioned at 32 and 33. The material 32 also serves as a support for the tubular partition 26.

As shown in FIGURE 2, the lamps 24, 28 and 30 are in an electric circuit 34 which may be connected to a conventional source of 110 volt electric supply by means of an electric plug 36. The electric circuit 34 includes normally open switches 38 and 40, the first of which is in series with lamp 24 for energizing the same when switch 38 is closed, and the second of which is in series with the parallel lamps 28 and 30 for energizing them when switch 40 is closed. Thus, lamps 24, 28 and 30 can be lit simultaneously, lamp 24 can be selectively lit alone, or lamps 28 and 30 as a unit can be selectively energized alone. From this it will be understood that the circular area 14 can be illuminated alone, the square frame area 16 can be illuminated alone, or both areas can be illuminated simultaneously. Also, the switches 38 and 40 can be conventional push button switches operable either by the feet or hands of the patient, or by other means, for purposes to be described more fully. As an alternative to the use of switches operated by the patient or therapist, the desired sequence of switching operations can be carried out by means of some automatic or semi-automatic switching device, such as a programming tape, cam-operated switches, automatic stepping switches, relays combined with timing devices, and so on.

The viewing means 42, shown in FIGURE 3, comprises a head band 44, adapted to fit around the head of the patient, and transparent light filters or polarizing or light filtering ports 46 and 48 adapted to be positioned over the right and left eyes, respectively, of the patient. The light filtering or polarizing portion 46 is oriented so that only light waves in horizontal planes can pass therethrough, and the light filtering or polarizing portion 48 is oriented so that only light waves in vertical planes can pass therethrough. Thus, light waves from the circular area 14 can pass through the light filtering or polarizing portion 46 but not through the light filtering or polarizing portion 48, and conversely, the light waves from the square frame area 16 can pass through the light filtering or polarizing portion 48 but not through the light filtering or polarizing portion 46. By virtue of this arrangement, when both areas 14 and 16 are illuminated a person with normal vision will see with his right eye only the circular area 14, as illustrated in FIGURE 5, and will see with his left eye only the square frame area 16, as illustrated in FIGURE 4. With both eyes seeing properly he will see both areas 14 and 16, one with the left eye and the other with the right eye, as is shown in FIGURE 6.

In operation, the housing 10 is positioned at one end of a room at approximately the eye level of a patient seated a short distance from the other end of the room. The front wall 12 is faced toward the patient and the switches 38 and 40 are preferably positioned at the patient's feet so he can selectively or simultaneously illuminate the circular and square frame areas 14 and 16. The viewing device 42 is then positioned on the head of the patient with the two light filters or light filtering portions 46 and 48 over his eyes. With the room darkened, the patient or therapist can now illuminate only the circular area 14 so as to require the patient's right eye to be his fixating eye, and this area can be repeatedly darkened and illuminated in a manner that is most suitable for treatment. Similarly, the square frame area 16 can be darkened and illuminated in a manner that is most suitable for treatment of the patient's left eye and to teach him to fixate with the left eye. Thus, the patient can be taught to see images with both eyes. Similarly, both areas can be illuminated simultaneously so as to carry on scheduled exercises which train the patient to properly use both eyes simultaneously and to fuse the images.

In the event the treatment requires changing the objects visible to the eyes, this can be accomplished merely by turning the housing 10 onto its side and the circular area will then be visible to the left eye of the patient and the square frame area will be visible to the right eye.

Having thus described my invention, I claim:

1. Eye training apparatus for use in treating strabismus patients having a tendency to suppress vision in one eye comprising means defining two separate concentric juxtapositive areas of illumination, viewing means embodying a pair of transparent light filters having different light filtering properties adapted to be positioned before the eyes of a patient and through which said areas can be viewed, light filtering means positioned over said areas including a pair of portions having light filtering properties that are complementary subtractive to the filtering properties respectively of the pair of filters of said viewing means to render one of said areas visible to one of the eyes of the patient and the other area visible to the other eye of the patient, and control means for simultaneously or selectively illuminating said areas.

2. Eye training apparatus for use in treating strabismus patients having a tendency to suppress vision in one eye comprising means defining two separate concentric areas of illumination, viewing means embodying a pair of light-polarizing filters adapted to be positioned before the eyes of a patient and through which said areas can be viewed, the respective axes of polarization of said filters being substantially at right angles to one another, light polarizing means positioned over said areas including a pair of polarizing portions wherein axes of polarization of the respective portions are substantially at right angles to one another and substantially parallel with the axes of polarization of the respective filters of said viewing means to render one of said areas visible to one of the eyes of the patient and the other area visible to the other eye of the patient, and control means for simultaneously or selectively illuminating said areas.

3. Eye training apparatus for use in treating strabismus patients having a tendency to suppress vision in one eye and having difficulty in fusing images seen by the two eyes, comprising means defining two separate areas of illumination, one of said areas being circular in shape and the other area being a square frame spaced from and symmetrically enclosing the circular area, light filtering means positioned over said areas having two light-polarizing portions oriented to polarize light passing therethrough in planes substantially at right angles to each other, one of said light-polarizing portions being positioned over said circular area and the other of said light-polarizing portions being positioned over the square frame area, viewing means adapted to be positioned before the eyes of a patient and embodying a pair of light polarizing filters oriented to polarize light therethrough in planes substantially at right angles to one another and generally parallel respectively with the polarizing planes of said areas so that visible light emanating from said circular area will be filtered out by its light-polarizing portion and one of the light-polarizing filters of said viewing means and visible light emanating from said square frame area will be filtered out by its light-polarizing portion and the other of the light-polarizing filters of said viewing means, and control means for simultaneously or selectively illuminating said areas.

4. Eye training apparatus for use in treating strabismus patients having a tendency to suppress vision in one eye and having difficulty in fusing images seen by the two eyes, comprising means defining two separate areas of illumination, one of said areas being circular in shape and the other area being a square frame spaced from and symmetrically enclosing the circular area, light filtering means positioned on said areas including a pair of portions one over the circular area and the other over the square frame area having different light filtering properties, viewing means adapted to be positioned before the eyes of a patient and embodying a pair of filters having light filtering properties that are complementary subtactive to the filtering properties respectively of the portions positioned over said areas to render the circular area visible to one of the eyes of the patient and the square frame area visible to the other eye of the patient, and control means for simultaneously or selectively illuminating said areas.

5. In eye training apparatus for use in treating strabismus patients, a housing having a front wall defining two concentric juxtapositive transparent areas, partition means within said housing excluding light communication therein between said areas, separate illumination means within said housing for illuminating the interior of the housing adjacent each of said areas, two transparent light filtering means having different light filtering properties positioned respectively over said transparent areas, and control means for simultaneously or selectively activating said illumination means.

6. In eye treating apparatus, a housing having a front wall defining a circular transparent area and a square frame transparent area spaced from and symmetrically enclosing said circular area, a tubular partition extending between the front and rear walls of said housing and engaging the front wall between the circular and square frame areas, first illumination means positioned within said tubular partition for illuminating said circular area, second illumination means positioned within said housing exterior of said tubular partition for illuminating said square frame area, two transparent light filtering means having different light filtering properties positioned respectively over said transparent areas, and control means extending to a position remote from said housing for simultaneously or selectively energizing the first and second illumination means.

7. In eye treating apparatus, a housing having a front wall defining a transparent circular area and a transparent square frame area spaced from and symmetrically enclosing said circular area, a tubular partition extending between the front and rear walls of said housing and engaging the front wall between the circular and square frame areas, first illumination means mounted on said rear wall and extending into the space defined by said tubular partition for illuminating said circular area, second illumination means mounted in said housing on said rear wall and extending into the space surrounding said tubular partition for illuminating said square frame area, light filtering means positioned over said circular and said square frame areas and having two light-polarizing portions oriented to polarize light passing therethrough in planes substantially at right angles to each other, one of said portions being positioned over said circular area and the other of said light-polarizing portions being positioned over the square frame area, and control means for simultaneously or selectively energizing the first and second illumination means.

8. In eye treating apparatus, a housing having a front wall defining a transparent circular area and a transparent square frame area spaced from and symmetrically enclosing said circular area, a tubular partition extending between the front and rear walls of said housing and engaging the front wall between the circular and square frame areas, an electric lamp mounted on said rear wall and extending into the space defined by said tubular partition for illuminating said circular area, a plurality of electric lamps mounted in said housing on said rear wall and extending into the space surrounding said tubular partition for illuminating said square frame area, light filtering means positioned over said circular and said square frame areas and having two light-polarizing portions oriented to polarize light passing therethrough in planes substantially at right angles to each other, one of said portions being positioned over said circular area and the other of said light-polarizing portions being positioned over the square frame area, translucent light diffusing means positioned between each of said lamps and their respective light-polarizing portions, and control means for simultaneously or selectively energizing said electric lamp and said plurality of electric lamps.

9. Eye training apparatus for a patient comprising a housing having a front wall defining a transparent circular area and a transparent square frame area spaced from and symmetrically enclosing said circular area, a tubular partition extending between the front and rear walls of said housing and engaging the front wall between the circular and square frame areas, an electric lamp mounted on said rear wall and extending into the space defined by said tubular partition for illuminating said circular area, a plurality of electric lamps mounted in said housing on said rear wall and extending into the space surrounding said tubular partition for illuminating said square frame area, light filtering means positioned over said circular area and said square frame areas and having two light-polarizing portions oriented to polarize light passing therethrough in planes substantially at right angles to each other, one of said portions being positioned over said circular area and the other of said light-polarizing portions being positioned over the square frame area, translucent light diffusing means positioned between each of said lamps and their respective light-polarizing portions, viewing means adapted to be positioned before the eyes of a patient and embodying a pair of light polarizing filters oriented to polarize light therethrough in planes substantially at right angles to one another and generally parallel respectively with the polarizing planes of said areas, and control means for selectively or simultaneously energizing the said electric lamp and said plurality of electric lamps.

References Cited in the file of this patent

UNITED STATES PATENTS

| | | |
|---|---|---|
| 2,676,588 | Shamsky | Apr. 27, 1954 |
| 2,803,246 | Lange | Aug. 20, 1957 |
| 2,837,087 | Sawyer | June 3, 1958 |
| 2,840,073 | Zeltzer | June 24, 1958 |
| 2,897,816 | Williams | Aug. 4, 1959 |

UNITED STATES PATENT OFFICE
CERTIFICATE OF CORRECTION

Patent No. 3,082,763            March 26, 1963

Samuel C. McLaughlin, Jr.

It is hereby certified that error appears in the above numbered patent requiring correction and that the said Letters Patent should read as corrected below.

Column 1, line 49, "of risease" read -- or disease --; column 5, lines 20 and 21, for "subtactive" read -- subtractive --

Signed and sealed this 5th day of November 1963.

(SEAL)
Attest:

ERNEST W. SWIDER

Attesting Officer

EDWIN L. REYNOLDS

Acting Commissioner of Patents